United States Patent
Wang

(10) Patent No.: US 8,566,409 B2
(45) Date of Patent: Oct. 22, 2013

(54) MOBILE COMMUNICATION TERMINAL AND MESSAGE AUTOMATIC CLEANING METHOD THEREOF

(75) Inventor: Yingxuan Wang, Shenzhen (CN)

(73) Assignee: Huizhou TCL Mobile Communication Co., Ltd., Huizhou, Guangdong (CN)

(*) Notice: Subject to any disclaimer, the term of this patent is extended or adjusted under 35 U.S.C. 154(b) by 159 days.

(21) Appl. No.: 12/997,213

(22) PCT Filed: Feb. 5, 2010

(86) PCT No.: PCT/CN2010/070531
§ 371 (c)(1), (2), (4) Date: Dec. 9, 2010

(87) PCT Pub. No.: WO2010/094224
PCT Pub. Date: Aug. 26, 2010

(65) Prior Publication Data
US 2011/0078273 A1 Mar. 31, 2011

(30) Foreign Application Priority Data
Feb. 23, 2009 (CN) .......................... 2009 1 0105525

(51) Int. Cl.
*G06F 15/16* (2006.01)

(52) U.S. Cl.
USPC ............ 709/206; 455/412; 455/466; 709/207

(58) Field of Classification Search
USPC ................... 455/412, 466; 709/206
See application file for complete search history.

(56) References Cited

U.S. PATENT DOCUMENTS

| 7,751,851 | B2* | 7/2010 | Lee et al. .................... 455/556.1 |
| 7,979,082 | B2* | 7/2011 | Dholakia et al. .............. 455/466 |
| 8,073,476 | B2* | 12/2011 | Deng et al. .................... 455/466 |
| 2003/0043260 | A1* | 3/2003 | Yap et al. ................... 348/14.06 |
| 2005/0020301 | A1* | 1/2005 | Lee ............................ 455/556.1 |
| 2010/0159889 | A1* | 6/2010 | Sigmund et al. .............. 455/413 |

FOREIGN PATENT DOCUMENTS

CN 1573773 A 2/2005

OTHER PUBLICATIONS

SIPO Office Action for Application No. 200910105525.0 (CN), dated Sep. 10, 2010.

* cited by examiner

*Primary Examiner* — Patrice Winder
*Assistant Examiner* — Eyob Hagos
(74) *Attorney, Agent, or Firm* — Shimokaji & Associates P.C.

(57) ABSTRACT

This invention provides a mobile communication terminal and a message automatic cleaning method thereof. The mobile communication terminal comprises a user interface unit, a man machine interface and a message module interface, a cleaning management unit, a timing trigger unit and a rule judgment unit. The message automatic cleaning method of the mobile communication terminal comprises the following steps: step a, setting message directory automatic cleaning frequencies and rules in a rule judgment unit; step b, setting a waiting period of a timing trigger unit; step c, judging whether current information accords with the cleaning rule when the set waiting period ends, and deleting the message if the information accords with the rule. With the mobile communication terminal and the message automatic cleaning method thereof provided in the present invention, messages can be automatically deleted in accordance with the time and manner set by the user, so insufficiency of memory space caused by the messages being not cleaned by the user for a long time is avoided. Hence, it facilitates the user.

8 Claims, 2 Drawing Sheets

MOBILE COMMUNICATION TERMINAL AND MESSAGE AUTOMATIC CLEANING METHOD THEREOF

TECHNICAL FIELD

This invention relates to the field of mobile communication, in particular, to a message automatic cleaning method of a mobile communication terminal.

BACKGROUND ART

The internal memory space of a mobile communication terminal, typically a handset, is comparatively limited due to the hardware condition thereof. However, users often receive various messages (including Short Message Service SMS, Multimedia Massage Service MMS, and Instant Message & Presence Service IMPS). Normally, these messages will occupy a large memory space of a handset. For users who frequently use these services (e.g., ordering a great deal of advertising or news), normal usage of the apparatus will be affected if the messages are not cleaned timely, particularly in a situation where multi-media messages (e.g., multimedia message) are popularized, the internal memory of a handset will often be used up, resulting in that new messages can not be received, thus causing inconvenience for the user's usage.

SUMMARY OF THE INVENTION

This invention aims to provide a mobile communication terminal and a message automatic cleaning method thereof, so as to overcome the defect where the internal memory of the existing mobile communication terminal is fully occupied by various messages.

The mobile communication terminal provided by the present invention comprises a user interface unit, a man machine interface and a message module interface. The user interface unit provides a user with a user set interface by invoking the man machine interface. The mobile communication terminal further comprises a cleaning management unit, a timing trigger unit and a rule judgment unit. The timing trigger unit sets a waiting period in accordance with the frequency set by the user, and triggers a cleaning management unit, which invokes the message module interface and cleans the message that accords with the cleaning rule according to the judgment performed by the rule judgment unit.

Still further, the timing trigger unit is a timer.

Still further, message automatic cleaning frequencies and rules are stored in the rule judgment unit.

The message automatic cleaning method of the mobile communication terminal provided in the present invention comprises the following steps:

step a, setting message directory automatic cleaning frequencies and rules in the rule judgment unit;

step b, setting a waiting period of the timing trigger unit;

step c, judging whether current information accords with the cleaning rule when the set waiting period ends, and deleting the message if the information accords with the rule.

Still further, the automatic cleaning frequency in step a is once a week.

Still further, the cleaning rule in step a includes retaining the message relating to exceptional numbers.

Still further, deleting the message in step c means putting the message in the Recycle Bin.

Still further, said message is deleted forever after being in the Recycle Bin for a given period.

With the mobile communication terminal and the message automatic cleaning method thereof provided in the present invention, messages can be automatically deleted in accordance with the time and manner set by the user. All operations for cleaning are performed at a backstage, and no more manual operations by the user are needed. That is, the message cleaning service is carried out without a user's intervention, so insufficiency of memory space caused by the messages being not cleaned by the user for a long time is avoided. Hence, it facilitates the user.

BRIEF DESCRIPTION OF ACCOMPANYING DRAWINGS

DETAILED DESCRIPTION OF THE PREFERRED EMBODIMENTS

Figure 1:
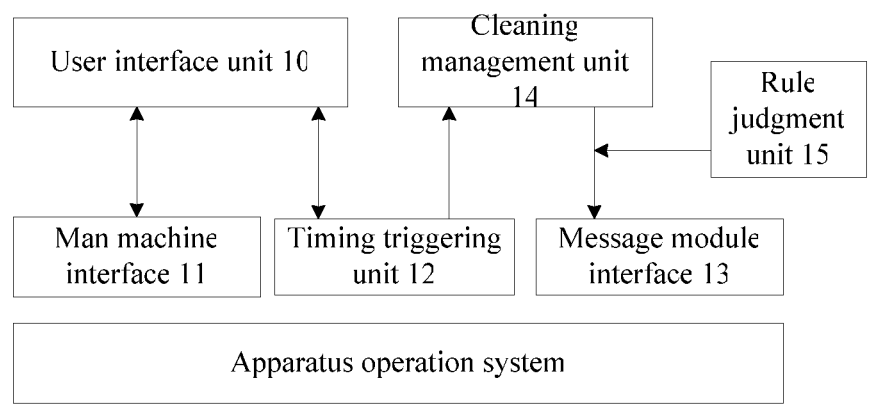
FIG. 1 is a schematic structural diagram for the mobile communication terminal provided in the present invention.

To make the objects, the technical solutions and advantages of the invention clearer, the present invention is further explained in a greater detail in combination with the accompanying drawings and embodiments. It should be known that the embodiments described here are only for explaining the invention, but not for limiting the invention.

The mobile communication terminal provided by the present invention comprises a user interface unit 10, a man machine interface (MMI) 11, a timing trigger unit 12, a message module interface 13, a cleaning management unit 14, and a rule judgment unit 15. These modules are established on the operation system of the mobile communication terminal apparatus and operate orderly, wherein user interface unit 10 may invoke man machine interface 11 to provide the user with a user set interface, on which the user may turn on or turn off the message automatic cleaning function as depicted in the invention. When the message automatic cleaning function is turned on, cleaning frequencies (once a week or once a day etc.) and cleaning rules (e.g., several exceptional numbers may be set, and messages corresponding to the numbers are not deleted when cleaning is performed) may be set corresponding to the message directory (e.g., inbox, outbox, draft box) Timing trigger unit 12 is for setting a waiting period (may be realized by a timer) in accordance with the frequency set by the user (e.g., once a week as stated above), and triggering cleaning management unit 14 when the waiting period ends. The cleaning management unit 14 invokes corresponding message module interface 13 in the mobile terminal apparatus after being triggered by the timing trigger unit 12. Rule judgment unit 15 judges whether the messages accord with the deleting rule, deleting the corresponding message in the message directory if it accords, and retaining the message if it does not accord (e.g., the several exceptional numbers as stated above).

Figure 2:
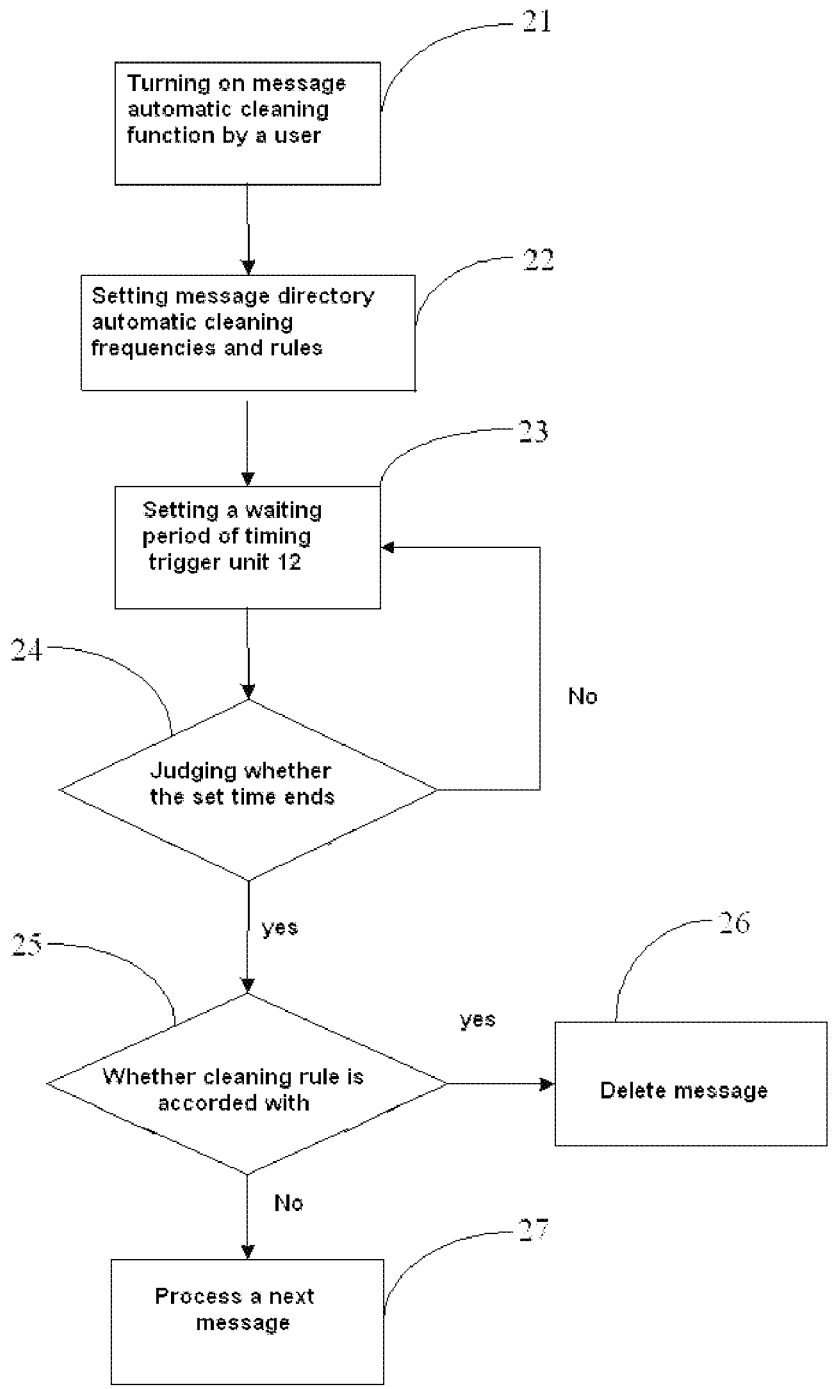
FIG. 2 is a schematic flow of the message automatic cleaning method provided in the present invention.

With reference to FIG. 2, the message automatic cleaning method of the mobile communication terminal provided in the present invention comprises the following steps:

After turning on a message automatic cleaning function by the user in step 21, perform step 22 by setting message directory automatic cleaning frequencies and rules in rule judgment unit 15 by the user; then set a waiting period of timing trigger unit 12 in step 23; judge whether the set waiting period ends in step 24, waiting if the time is not up, and judging whether the cleaning rule is accorded with in step 25 if the time ends. If the rule is accorded with, delete the message in step 26, and if the rule is not accorded with, process a next message. Certainly, the first information being processed may be the information being earliest received or sent, thus judgments can be performed one by one according to time.

With the mobile communication terminal and the message automatic cleaning method thereof provided in the invention, messages can be automatically deleted in accordance with the time and manner set by the user, e.g., the user sets cleaning once a week, then all the information that accords with the cleaning rule received and sent last week will be deleted at the set time at each Monday. All operations for cleaning are performed at a backstage, and no more manual operations by the user are needed. That is, the message cleaning service is carried out without a user's intervention, so insufficiency of memory space caused by the messages being not cleaned by the user for a long time is avoided. Hence, it facilitates the user.

The above are the preferred embodiments of the invention, but they are not used to limit the invention. For example, a message may be first put into the information Recycle Bin of a mobile communication terminal when the message is to be deleted. If the user wants to view this message within a certain period (e.g., three days), he or she may view the message in the Recycle Bin or restore the deleted information. The information will be deleted forever after being stored in the Recycle Bin for three days. Any amendments, equivalent substitutions and improvements etc. made within the basic spirits and rules of the present invention shall be included in the protection scope as claimed in the claims of the present invention.

The invention claimed is:

1. A computer program product stored on a mobile communication terminal that includes a tangible computer storage device, comprising computer readable program code configured to:
   configure a man-machine interface to provide a user interface;
   interface with a first message among a plurality of messages from the man-machine interface in the mobile communication terminal;
   store a plurality of first rules for deciding which information in the plurality of messages to delete from the computer storage device;
   clean the first message according to the first rules;
   switch the mobile communication terminal between automatic cleaning mode and non-automatic cleaning mode, wherein automatic cleaning mode is configured to automatically clean the first message according to the first rules;
   set a waiting period frequency and trigger the cleaning of the first message after the waiting period, and
   enable a user to manually restore from a recycle bin a selected deleted one of the plurality of messages wherein the recycle bin is configured to automatically delete the selected message after a given period.

2. The computer program product according to claim 1, wherein said triggering uses a timer.

3. The computer program product according to claim 1, wherein the waiting period frequency is stored in said computer storage device.

4. The computer program product according to claim 1, including computer-readable instructions configured to:
   set frequencies for automatically cleaning a plurality of messages in a message directory;
   set a plurality of second cleaning rules for selecting which information in the plurality of messages to clean one of the plurality of messages from the message directory;
   set a waiting period before cleaning one of the plurality of messages;
   determine whether current information accords with the second cleaning rules for cleaning the second message when the set waiting period ends, and
   delete the second message if the information accords with the second cleaning rules.

5. The computer program product according to claim 4, wherein those of the plurality of messages with information selected to be cleaned is automatically cleaned once a week.

6. The computer program product of claim 4, including instructions configured to retain one of the plurality of messages in response to the one of the plurality of messages being related to a specified number.

7. The computer program product of claim 4, including instructions configured to delete one of the plurality of messages by placing the plurality of messages in a Recycle Bin.

8. The computer program product of claim 7, wherein a deleted one of the plurality of messages is deleted forever after being in the Recycle Bin for a given period.

* * * * *